United States Patent Office 2,713,074
Patented July 12, 1955

2,713,074

ALUMINUM ALCOHOLATE REDUCTION OF OXO ALDEHYDE MIXTURES

Kenneth K. Kearby, Cranford, N. J., assignor to Esso Research and Engineering Company, a corporation of Delaware No Drawing. Application August 25, 1949,
Serial No. 112,395

4 Claims. (Cl. 260—638)

This invention pertains particularly to a method of reducing aldehydes and other reducible organic compounds having double bonded carbon constituents (—C=C— and >C=O) in liquid mixtures with alcohols simultaneously interreacted with aluminum. The organic compounds of aluminum formed in this reaction are hydrolyzed to recover the organic products and to obtain a separate aqueous slurry of aluminum hydroxide that is useful for producing active alumina.

The method of this invention is remarkably adapted for reducing various types of high-boiling carbonyl compounds, including aldehydes, ketones, esters, acids, and olefins in crude mixtures thereof. High-boiling alcohols which take part in the reaction may be initially present in the crude mixture or be formed in the reaction by reduction of the carbonyl compounds, and other alcohols may be admixed.

Industrial products such as crude petroleum refining products, oxidized hydrocarbon products, hydrated olefins, Fischer Synthesis and Oxo synthesis products come within the category of complex mixtures to which the reduction process of this invention may be applied.

A procedure for carrying out the reduction process comprises the steps of forming a liquid solution mixture of the reducible compounds with a suitable amount of alcohol, then admixing aluminum in suitable amounts and of suitable particle size to control the rate of reaction at moderate temperatures, e. g. in the range of 20° C. to 150° C.

One atomic weight of the trivalent aluminum metal on reacting with the oxy compounds in the reaction mixtures reduces 1½ moles of aldehyde or its equivalent. The exact mechanism of the reaction is not fully understood, because it is possible to form compounds of aluminum with the carbonyl compounds as well as with the hydroxy compounds, for the hydroxy compounds to undergo a condensation with the carbonyl compounds, and for the aldehydes to react to form esters. However, the main reaction obtained is a reduction of the reducible organic compounds and this reaction goes substantially to completion; therefore, the theoretical amounts of the aluminum needed can be readily determined.

During the reduction reaction, if the metal particles admixed are extremely small, the reaction will tend to go violently, but with suitable cooling of the reaction mixture, the rate of reaction is regulated. The temperature of the reaction mixture is controlled at the start to initiate the reaction, which evolves heat; and the reaction mixture will usually start boiling of the most volatile organic compounds present, but by carrying out the reaction under reflux, the organic materials which are to be reduced are kept in the reaction zone.

From the viewpoint of having the reduction reaction proceed further toward completion with good control of operating conditions, a somewhat lower-boiling alcohol of low water-miscibility is admixed with the high-boiling reducible compounds, e. g. $C_4$ to $C_6$ alcohols with a crude mixture of $C_8$ aldehydes so that the relatively lower-boiling alcohol boils and refluxes at the desired reaction temperature in the range of about 100° to 150° C. The relatively lower-boiling alcohols can then be easily recovered at the end of the reaction and reused.

There are additional control measures which may be used for regulating the reaction, such as, an addition of small amounts of catalytic substances like mercuric chloride and carbon tetrachloride, which accelerate the reaction, the use of slower or faster acting metal alloys of aluminum with magnesium or zinc, the use of diluents, refrigerants, etc. Saturated hydrocarbons may be employed as inert diluents and more volatile saturated hydrocarbons which boil at the desired reaction temperature may be used to aid in controlling the temperature.

The reaction may be carried out batchwise or continuously. In general, the reduction reaction is terminated when the added metal has been fully converted to its hydrolyzable organic compounds.

Following the reduction reaction, the product is mixed with water for hydrolysis of the metal-organic compounds, then the organic products obtained can be separated by physical methods and the resulting water-insoluble metal hydroxides can be recovered. Hydrolysis of the resulting alcoholates yields the desired alcohols and an aqueous slurry of hydrous alumina which can be used to obtain active alumina valuable as an adsorbent or to form catalysts, since mineral acids need not be admixed to obtain the hydrolysis. The thus obtained alumina can be used for dehydrating or for separation purposes requiring active adsorbents. Also, this alumina is a valuable component of catalysts, such as, zinc or magnesium aluminates, alumina-chromia, alumina-molybdena, and alumina-silica catalysts.

An advantageous feature of the invention is obtained in the formation of an organic product which is easily separated from the aqueous slurry formed by the hydrolysis. This organic product may be further separated into fractions by steam distillation.

During the reduction reaction, the reaction mixture is preferably close to anhydrous, but small amounts of moisture are tolerated.

A typical complex mixture used for testing the process was a crude $C_8$ Oxo aldehyde mixture, formed by reacting $C_7$ olefin polymers with carbon monoxide and hydrogen in the presence of a cobalt catalyst. This type of mixture contains alcohols, aldehydes, ketones, acetals, hemiacetals, aldols, esters, acids, unsaturated hydrocarbons, and organic sulfur compounds, some of which are not exactly identifiable and other unidentified substances. In such mixtures, many of the substances have been generally regarded as unstable and as having a tendency to undergo condensation reactions when heated together. It is, therefore, rather surprising that the reduction of these mixed substances is carried out as easily as is done with the method of the present invention.

Examples and results obtained from experiments illustrate how the reduction occurs with respect to the various substances in a crude complex Oxo aldehyde mixture.

EXAMPLE 1

On an industrial scale operation, a crude aldehyde-alcohol mixture is self-sufficient for the reaction without addition of lower alcohols; however, a hydrocarbon diluent, preferably a higher boiling hydrocarbon or hydrocarbon mixture may be used as a diluent. While a crude $C_8$ aldehyde-alcohol mixture is fed to a reaction zone in which aluminum particles are dissolving, a liquid reduction product stream can be taken off. After hydrolysis of the liquid reduction product containing principally alcoholates, the $C_8$ alcohols can be separated and any unreacted aldehyde can be returned for further reaction. The overall main reaction in the treatment of the Oxo C₈ aldehyde-alcohol mixtures is represented by the following equation:

3 Octanal + 3 Octanol + 2Al → 2(C₈H₁₇O)₃Al

2(C₈H₁₇O)₃Al + 6H₂O → 6 Octanol + 2Al(OH)₃

Thus, on a theoretical basis, the net product is 3 moles of octyl alcohol from 3 moles of the C₈ aldehydes per mole of Al₂O₃, and this amounts to about 15 tons of alumina per 400 barrels of octyl alcohol.

During the reduction reaction very little gaseous hydrogen is evolved or lost. It is thus indicated that the hydrogen is transferred from the hydroxyl group of the alcohols in forming the alcoholates and substantially fully utilized in reducing the double bonds of the aldehydes and other reducible compounds present in the crude mixture.

Upon hydrolysis, the organic compounds of aluminum that are formed during the reduction reaction are decomposed to obtain the reduced organic compound and the hydrous alumina. The high-boiling alcohol products mixed with other reduced organic compounds and hydrocarbon diluent forms a separate liquid layer which can be easily separated by decantation from the aqueous slurry of hydrous alumina in an excess of the water used for hydrolysis.

The slurry of hydrous alumina is removed for further treatment to recover alumina gel, alumina sol, solid alumina, aluminates, coprecipitated mixtures of alumina with other oxides.

In order to test the efficiency of the process, experimental tests were made by admixing various alcohols, as illustrated in the following examples:

EXAMPLE 2

A solution was formed of 576 parts by weight of crude Oxo C₈ aldehyde-alcohol mixture with 792 parts by weight of mixed pentanols. To the solution was added 1.5 parts by weight of HgCl₂ and 9.5 parts by weight of CCl₄. The resulting solution was reacted with 81 parts by weight of aluminum granules, 8 mesh size. The reaction mixture became warm and boiled under reflux at about 120° C. After all the aluminum had undergone reaction, the liquid product was cooled and water was added. An organic layer separated above an aqueous layer slurry of aluminum hydroxide. The organic layer which included pentanols with the reduction product was separable by decantation.

With a hydrocarbon diluent present in the reaction mixture, or by using a hydrocarbon oil solvent to extract the partly-soluble organic compounds, a more nearly complete separation of the organic product from the water layer is obtained.

For the purpose of analysis and determining yields, all organic material was steam distilled from the water slurry layer, the organic distillate was separated from aqueous condensate, dried by contact with magnesium sulfate, then stripped of volatile organic compounds including the pentanols by boiling up to 155° C. The residual organic product was analyzed.

The aqueous slurry of aluminum hydroxide separated from the organic product was settled, the water was decanted, and the aluminum hydroxide deposit was dried at about 482° C. to obtain alumina of high surface area, 389 sq. meters per gram.

EXAMPLE 3

A mixture was prepared of 1400 cc. isopropyl alcohol with 705 cc. of the crude Oxo C₈ aldehydes, 1.5 g. of HgCl₂ and 6 cc. of CCl₄. Into the mixture was dissolved 81 grams of aluminum granules, and the mixture was boiled under reflux until all the aluminum was dissolved. Half the resultant liquid product was hydrolyzed with water, and the hydrolyzed organic product was separated from a resultant aqueous slurry of aluminum hydroxide by steam distillation. Organic material boiling below 105° C. was stripped from the organic product after it was dried, and the residual liquid organic product was analyzed.

EXAMPLE 4

The other half of the unhydrolyzed product obtained in Example 3 was mixed with additional 700 cc. of crude Oxo C₈ aldehyde and the resulting mixture was allowed to boil under reflux while acetone was taken off. The residual product was hydrolyzed with water. The hydrolyzed organic product was steam distilled, dried and stripped of organic material boiling below 105° C. The resulting residual organic product was analyzed.

Alumina having a surface area of 294 sq. meters per gram was obtained by separating aluminum hydroxide from the aqueous slurry formed by the hydrolysis and drying this aluminum hydroxide.

Analyses of the crude Oxo aldehyde material and of the products formed by reduction of its components are summarized in the following table:

Table
SUMMARY OF ANALYSES

| Determination | Crude Oxo Aldehyde | Products from Experiments | | |
| --- | --- | --- | --- | --- |
| | | 1 (Pentanols Used) | 2 (Isopropanol Used) | 3 (Isopropanol Used Acetone Removed) |
| Saponification No.[1] | 32.7 | 8.5 | 18.46 | 25.6 |
| Neutralization No.[1] | 4.5 | 2.6 | 3.16 | 11.0 |
| Bromine No., cgs./ml | 33.1 | 4.6 | 4.3 | 7.0 |
| Hydroxyl No.[1] | 85 | 307 | 232 | 306 |
| Carbonyl No.[1] | 157 | 8.2 | 9.1 | 15.8 |
| Grams C₈ Alcohol/gm | .197 | .712 | .539 | .710 |
| Grams C₈ Aldehyde/gm | .359 | .019 | .021 | .036 |
| Percent Alcohol [2] | 35.5 | 97.5 | 96.3 | 96.2 |
| Percent Aldehyde [2] | 64.5 | 2.5 | 3.7 | 4.8 |

[1] mg. KOH/gm.
[2] On basis of total C₈ alcohols and aldehydes.

From the compared data it can be seen that nearly complete reduction of the aldehydes to corresponding alcohols is obtainable, especially when the alcohols participating in the reaction have low solubility in water as in Exampels 1 and 2 (Experiment 1). At the same time the lowering of the saponification number and the lowering of the neutralization number, which occurred mainly with the higher alcohols (C₄+), indicate that substantial reduction of the esters and acids occurs. The lowering of the bromine number indicates the saturation of olefins.

Experiments 2 and 3 (Examples 3 and 4) demonstrate that in using a water-soluble alcohol, e. g. isopropyl alcohol, the reduction of the organic compounds might not be as extensive, but a smaller amount of aluminum metal may be employed because these alcohols undergo dehydrogenation to their corresponding more volatile carbonyl compounds that are removed from the reaction zone. The overall reaction that occurs in using isopropyl alcohol is represented by the following equation 9 Octanal + 6 i-PrOH + 2Al → 3 Octanol + 2 (C₈H₁₇O)₃Al + 6 acetone Thus, it can be seen that in this reaction only 2 atomic weight parts of aluminum are needed in the reduction of 9 molecular weight parts of the C₈ aldehydes. Methanol or ethanol may be employed in place of isopropyl alcohol similarly, with the production of the corresponding C₁-C₂ aldehydes.

What is claimed is:

1. The method of hydrogenating reducible liquid organic carbonyl compound in a crude Oxo synthesis aldehyde-alcohol solution to convert the carbonyl compound into an alcohol, which comprises diluting said alcohol solution with a saturated hydrocarbon solvent, dissolving aluminum into the resulting alcohol solution diluted with the hydrocarbon solvent, simultaneously hydrogenating the carbonyl compound in the alcohol solution as the aluminum undergoes reaction with alcohol in the solution, thereafter hydrolyzing the resulting reaction product including alcoholates of aluminum by admixing water, and separating organic compounds obtained by hydrolysis of the reaction product in the hydrocarbon solvent from the resulting aqueous slurry of aluminum hydroxide.

2. The method of hydrogenating reducible components in a crude Oxo synthesis aldehyde mixture containing alcohols which comprises adding to said mixture a lower boiling alcohol, dissolving aluminum in said mixture by reacting the aluminum with alcohols in the mixture and simultaneously hydrogenating to the reducible components in said mixture by hydrogen liberated from the alcohols undergoing reaction with the aluminum, boiling said mixture under reflux, removing by distillation a carbonyl compound derived by reaction of the added lower boiling alcohol with the aluminum, hydrolyzing a residual reaction product of the hydrogenated mixture and aluminum, and separating hydrolyzed organic products from an aqueous slurry of aluminum hydroxide.

3. The method of claim 2 in which the lower boiling alcohol is a $C_1$ to $C_3$ alcohol.

4. The method of hydrogenating reducible components in a crude Oxo synthesis mixture containing water-insoluble esters, acids, aldehydes, alcohols and olefins which comprises adding aluminum to said mixture, reacting the added aluminum with alcohols in said mixture at a temperature in the range of 100° to 150° C. to form aluminum alcoholates which on hydrolysis yield water-insoluble aluminum hydroxide, simultaneously hydrogenating other components in said mixture by hydrogen liberated from the said alcohols as they react with the aluminum until reaction of the components in said mixture brings about formation of organic products having a substantially lower Carbonyl number, lower Bromine number and lower Saponification number but with a higher Hydroxyl number, hydrolyzing the reaction products thus obtained, and separating organic products from a water slurry of the aluminum hydroxide formed by the hydrolysis.

References Cited in the file of this patent

UNITED STATES PATENTS

| | | |
|---|---|---|
| 1,802,468 | Ho | Apr. 28, 1931 |
| 1,802,472 | Kunz | Apr. 28, 1931 |
| 2,098,206 | Hartung et al. | Nov. 2, 1937 |
| 2,394,848 | Doumani | Feb. 12, 1946 |
| 2,636,865 | Kimberlin | Apr. 28, 1953 |